Patented June 13, 1944

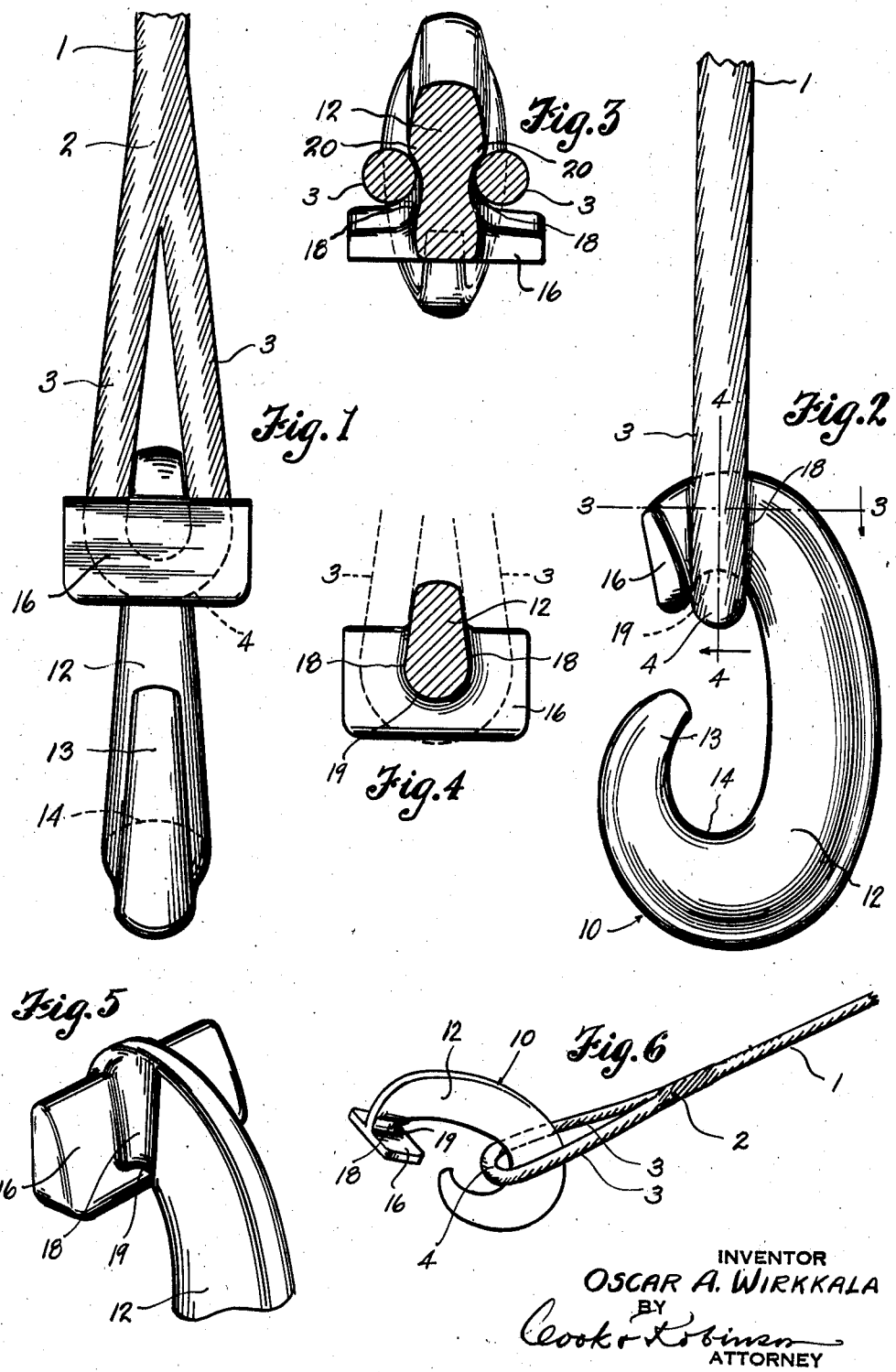

2,351,176

UNITED STATES PATENT OFFICE 2,351,176

HOOK AND CABLE CONNECTION

Oscar A. Wirkkala, Seattle, Wash.

Application February 20, 1943, Serial No. 476,525

7 Claims. (Cl. 294—82)

This invention relates to improvements in hooks and in hook and cable connections, and it has reference more particularly to novel means for the attaching of a hook, or the like, to a cable whereby to adapt it to its functional use; it being the principal object of this invention to provide an improved form of direct connection between a hook, or the like, and a cable, thereby to eliminate the use of any auxiliary means such as the usual connecting pin, knob, shackle, or swivel.

Explanatory to the present invention, it will here be called to the attention that today, in the State of Washington alone, there are thousands of hooks designed for the various requirements in rigging as used in logging operations and in various industries associated therewith. There are many more thousands of hooks, of many different kinds, now used in the marine shipping industry, as well as on ships of the Navy, and in the Merchant Marine, for cargo handling and analogous uses. In practically all of their uses, as employed in logging, for cargo handling and for the many other applications, these hooks are attached to steel cables by means of pins. Usually the pin is applied to the hook in combination with a swivel, or in a swivel shackle combination; it being the general method of assembly to apply an attaching pin through a loop or eye at the end of the cable after the eye has been applied to a shackle, or swivel link or to the head of the hook shank. It is significant that in practically all forms of cable and hook connections, whether they employ a swivel shackle, plain shackle or direct connection, a pin is invariably employed to complete the connection. Without enumerating the many items of expense, incident to manufacture as well as in assembly of parts, generally used in making hook and cable connections, it will be mentioned here that the present invention provides for the complete elimination of the pin, wherever used in such connections, as well as the elimination of the shackle and swivel by reason of the provision as herein set forth for direct connection of the cable through the mediacy of a loop or eye splice at its end, with the hook shank.

It is also an object of the present invention to provide a cable and hook combination that permits the hook to be readily and easily applied or removed from its functional connection with the cable. Furthermore, to provide certain details of construction whereby the working relationship of the hook and cable when assembled for use, is positively insured.

More specifically stated, this invention resides in a steel cable and hook connection wherein the cable end is looped back upon itself and secured to form an eye splice of such length as to provide the resiliency required for the springing apart of the opposite side parts of the eye splice or loop for reception of the hook shank in the eye; and wherein the hook shank is formed at its attaching end with a rounded seat to receive the base of the loop thereagainst, and has a cross head adjacent the seat to retain the cable loop against displacement from the seat in a secure, and safe connection.

Still further objects of the invention reside in the details of construction of the parts of the hook provided for seating and securing the cable against release and whereby to insure the cable against damage by elimination of sharp turns and flat surfaces where engaged by the base of the eye splice.

Still other objects of the invention reside in those features of construction of the parts employed in combination whereby cost of construction is reduced; whereby materials are saved and weight is reduced without detriment to effectiveness of the hook or its efficiency.

In accomplishing these and other objects of the invention, I have provided the improved details of construction, the preferred forms of which are illustrated in the accompanying drawing, wherein—

Fig. 1 is a front edge view of a cable and hook combination embodied by the present invention.

Fig. 2 is a side view of the same parts.

Fig. 3 is a horizontal section on line 3—3 in Fig. 2, showing the disposition of the opposite side portions of the cable eye or loop at the sides of the hook shank and as held in place by the cross head at the end of the shank.

Fig. 4 is a cross section on the line 4—4 in Fig. 2.

Fig. 5 is a perspective view showing the relationship of the cross head and cable seat at the attaching end of the hook shank.

Fig. 6 is a perspective view, illustrating the method of applying or removing a hook from the cable loop.

Before giving a detailed description of the present combination of parts, it will here be emphasized that it is not my intention to confine the invention to any specific type of hook, or to hooks as applied to any specific industry; it being the intent that the claims which terminate this specification shall be based upon the elements or parts essential to or employed in making a cable connection whether the connection be with a logging hook, cargo hook or with any other type of implement or article so long as it is consistent with the objects of the invention. Therefore, when I refer to hooks, this term may be interpreted also as any article of that nature which it may be desirable to affix to a cable, such for example, as an anchor, or a drag or a bucket.

Referring more in detail to the drawing—

1 designates a cable, and in this particular invention, it is anticipated that it is composed of steel strands, or what most commonly is referred to as "wire rope." This cable is provided at that end with which the connection is to be made with an eye loop that is formed by looping an end portion of the cable back upon itself and splicing the end to the main cable at the top of the loop. In the drawing, such a splice is indicated at 2 in Figs. 1 and 6. This loop or eye, in the industry, is frequently referred to as the eye splice. The eye or loop of the cable comprises opposite side portions 3—3, as noted best in Fig. 1, and these merge into each other at the base of the loop in a rounded turn as designated at 4. It is significant, in the making of this eye or loop in a wire rope for the present purpose, that the side portions 3—3 be of sufficient length that they may be sprung apart to receive the hook shank in the loop as required for the application or removal of the hook from the cable. This is mentioned because, when heavy steel cable is used, for example, cable of one inch diameter, it has relatively little flexibility between closely located points and if the eye splice or loop is short in length, it may be extremely difficult to apply or remove the hook therefrom.

The hook, which is here shown in connection with the cable is of a type that is quite suitable for use as a cargo hook. It is designated in its entirety by reference numeral 10 and it comprises a body shank 12 which at its lower end is formed in an upturned hook portion 13 forming a seat 14. At its upper end, or what may be designated as the attaching end, the shank is formed with a relatively short, down-turned head portion 15 equipped at its end with a flat cross head, or plate 16 that extends equally to opposite sides of the shank and perpendicular to the plane of the hook.

As will be understood best by reference to Figs. 2 and 5, the shank 12 is formed in its opposite side surfaces, adjacent its juncture with the cross head, with inwardly rounded channels 18—18 and these lead into a rounded seat 19 that is formed across the base edge of the shank adjacent the cross head. This seat is of a curvature corresponding to the curvature of the cable in a transverse section, and also is curved to correspond to the curvature of the base of the loop. This latter curvature is such as to prevent damage due to any sharp bend that might kink the cable under heavy strain.

To apply the hook to the cable eye for its functional securement to the cable, the end of the hook 13 is first inserted through the cable eye as seen in Fig. 6, then the loop is moved along the shank until the base of the eye loop is engaged within the seat 19 and the sides of the eye or loop engaged in the channels 18—18 as in Figs. 1 and 3.

By reason of the formation of the channels 18—18 in the opposite side surfaces of the shank, there will be shoulders as at 20 to engage the loop to hold it in place.

It is to be pointed out also that the cable, when applied to the shank as observed in Figs. 1 and 2, is directly alined with the hook seat 14. Therefore, under load, as in handling a cargo sling, the eye splice is retained seated in the channels 18—18 and against seat 19, and there are no forces tending to disengage the hook from the eye splice.

By reference to Fig. 4, it will be understood that the seat 19 is curved to seat the end of the cable eye thereagainst without causing any sharp bend in the cable. Also, it is to be understood that the bend in the base of the loop is not sufficient to cause any kinking effect in the cable strands or any flattening of the cable when placed under heavy strain.

With the hook so applied to the cable loop, it will be held against any looseness in the connection and will retain its relationship to the cable. It is explained that after the cable has once been put under heavy strain the eye will be drawn practically straight as in Fig. 1 and it then retains the hook in place relative to the loop. However, to release the hook for removal, it becomes necessary only to slightly spring the sides of the loop apart enough to clear the shoulders 20—20, then to detach it from the hook by moving the loop along the shank in a direction opposite that for application.

This type of connection is suitable for hooks of many kinds, for anchors and for various other devices where it is desirable to provide a detachable connection.

The advantages to be derived by the provision of this kind of connection is best understood when manufacturing costs are considered, and this takes into consideration the lesser weight of construction and cost of materials due to elimination of the pin and shackle connections. The hooks require no tool work as usually required for drilling holes, threading pins, applying shackles, etc.

Having thus described my invention, what I claim as new therein and desire to secure by Letters Patent is:

1. In combination, a rigging hook having a body shank terminating at its attaching end in a bend that is turned in a direction to overlie the entrance to the hook seat and providing a cable seat at the inside of the bend, a cross head formed at the end of the bend adjacent the cable seat and a cable formed with an eye loop applied about the shank; the base of the loop being engaged in the said cable seat and the side portions of the loop being engageable with the cross head to retain the hook against disconnection from the cable.

2. The combination with a rigging hook comprising a body shank formed at its lower end with a hook and formed at its upper end with a bend turned in a direction to overlie and to restrict the entrance to the hook seat, a crosshead at the end of the bend, and there being a cable seat at the inside of the bend, adjacent the crosshead and there being channels in the sides of the bend leading into said cable seat, of a cable formed with an eye loop at its end applied about the hook shank at the bend with the base of the loop engaged in the cable seat and the opposite side portions of the loop disposed in said channels and engageable with the cross head to retain the hook against disconnection from the cable.

3. In combination, a rigging hook comprising a body shank formed at its lower end with a hook end and formed at its upper end with a bend providing a cable seat at the inside of the bend, said bend being in the direction of the hook end and restricting the entrance to the hook seat and to the cable seat, and said bend having opposite side channels therein leading into said cable seat, a cross head at the end of the bend, and a cable formed with an eye loop at its end applied about the shank at the bend and with the base of the loop engaged in the cable seat and the opposite side portions of the loop disposed in said channels and engageable with the cross head to retain the hook against disconnection from the cable; said loop being adapted to be removed from the hook by outward movement of the side member to displace them from the channels followed by movement of the loop along the shank and from the hook end thereof.

4. A rigging hook comprising a body shank terminating at its lower end in a laterally and upwardly turned portion forming a hook seat and a restricted entrance to the seat and having a lateral bend at its upper end that overlies the entrance to the hook seat and provides a downwardly facing cable seat, and a cross head integral with the end of the lateral bend and adjacent the said seat.

5. A rigging hook comprising a body shank terminating at its lower end in an upturned hook, and at its upper end having a downward bend overlying and restricting the entrance to the hook seat and formed with a cable seat transversely across the under side of the bend, and formed in opposite faces thereof at the bend with channels merging into the cable seat to receive a cable loop therein, and a cross head integral with the shank at the bend adjacent the outside of the said seat and cable channels.

6. A hook comprising a body shank terminating at its lower end in an upturned hook, and at its upper end in a downward bend directly overlying the said hook and forming a transverse cable seat at the under side of the bend, and there being cable seating channels in the opposite sides of the shank at the bend merging into the seat and directed toward the base of the hook, and a cross head integral with the shank at the end of the upper bend adjacent the cable channels and seat.

7. In combination, a hook comprising a body shank terminating at its lower end in an upturned hook, and at its upper end in a downward bend directly overlying the said hook and forming a transverse cable seat at the under side of the bend, and there being cable seating channels in the opposite sides of the shank at the bend merging into the seat and directed toward the base of the hook, and a cross head integral with the shank at the end of the upper end bend adjacent the cable channels and seat, and a cable formed at its end with an eye loop applied about the shank, with the base of the loop seated in the transverse seat and with the side members of the loop engaged in the said channels.

OSCAR A. WIRKKALA.